(12) United States Patent
Lewis

(10) Patent No.: US 10,745,648 B1
(45) Date of Patent: Aug. 18, 2020

(54) SYSTEM AND METHOD FOR THE EXTRACTION OF ROSIN OIL

(71) Applicant: Andrew Lewis, Smithfield, RI (US)

(72) Inventor: Andrew Lewis, Smithfield, RI (US)

(*) Notice: Subject to any disclaimer, the term of this patent is extended or adjusted under 35 U.S.C. 154(b) by 374 days.

(21) Appl. No.: 15/828,903

(22) Filed: Dec. 1, 2017

Related U.S. Application Data

(60) Provisional application No. 62/428,570, filed on Dec. 1, 2016.

(51) Int. Cl.
| | |
|---|---|
| *C11B 13/00* | (2006.01) |
| *B30B 9/04* | (2006.01) |
| *B30B 15/06* | (2006.01) |
| *B30B 15/34* | (2006.01) |
| *B30B 15/00* | (2006.01) |
| *B30B 15/26* | (2006.01) |
| *B30B 15/08* | (2006.01) |
| *B30B 15/04* | (2006.01) |
| *B30B 13/00* | (2006.01) |

(52) U.S. Cl.
CPC .............. *C11B 13/005* (2013.01); *B30B 9/04* (2013.01); *B30B 9/047* (2013.01); *B30B 13/00* (2013.01); *B30B 15/0035* (2013.01); *B30B 15/04* (2013.01); *B30B 15/064* (2013.01); *B30B 15/065* (2013.01); *B30B 15/08* (2013.01); *B30B 15/26* (2013.01); *B30B 15/34* (2013.01)

(58) Field of Classification Search
CPC .. B30B 9/04; B30B 9/047; B30B 9/06; B30B 9/26; B30B 13/00; B30B 15/0035; B30B 15/064; B30B 15/065; B30B 15/08; B30B 15/04; B30B 15/26; B30B 15/34; C11B 13/005
See application file for complete search history.

(56) References Cited

U.S. PATENT DOCUMENTS

| | | | | |
|---|---|---|---|---|
| 2,519,984 | A * | 8/1950 | Speaker | B30B 1/04 156/580 |
| 2007/0023949 | A1* | 2/2007 | Nakamura | B30B 9/065 264/109 |
| 2009/0293742 | A1* | 12/2009 | Murphy | B01D 29/27 100/215 |
| 2018/0008655 | A1* | 1/2018 | Weikel | A61K 36/185 |

* cited by examiner

*Primary Examiner* — Jimmy T Nguyen
(74) *Attorney, Agent, or Firm* — Bay State IP, LLC

(57) ABSTRACT

A system and method for the extraction of a material, wherein the system is configured for use with a press assembly and the extraction system includes a press ram, a pressure vessel for holding the material to be extracted, a filter, bottom hot plate and a cooling plate. The extraction system a novel system and method for improved marijuana oil and rosin extraction and manufacturing.

12 Claims, 3 Drawing Sheets

SYSTEM AND METHOD FOR THE EXTRACTION OF ROSIN OIL

CROSS REFERENCE TO RELATED APPLICATION

This application claims the benefit of and takes priority from U.S. Provisional Application Ser. No. 62/428,570 filed on Dec. 1, 2016, the contents of which are herein incorporated by reference.

FIELD OF THE INVENTION

The present invention relates generally to marijuana rosin extraction, specifically the extraction of rosin oil from a marijuana leaf.

BACKGROUND OF THE INVENTION

Presses are machine tools that are able to change the shape of a workpiece by the application of pressure. Presses can be classified according to their mechanism: hydraulic, mechanical, pneumatic; their function: forging presses, stamping presses, press brakes, punch press, etc.; their structure; or their controllability.

Rosin refers to an extraction process that utilizes a combination of heat and pressure to nearly instantaneously squeeze resinous sap from an initial starting material. The term "rosin" originated as a method of making a product used to lubricate violin bows. Further, rosin is a sticky, stinky resin that comes from pine trees, and was sometimes known as unrefined turpentine. It's used in industrial processes and in some instances, baseball pitchers illegally use pine rosin to change ball dynamics.

*Cannabis*, also known as marijuana, also produces rosin, and may be extracted from a cured marijuana flower, bud, or hash. To remove the rosin from marijuana, a heat extraction method is typically used. Traditionally two methods have been used for extracting the oil from *cannabis* leaves. These methods include Butane Hash Oil (BHO) and CO2 extraction. In *cannabis*, the main compounds that producers are looking to extract are cannabinoids and terpenes—these compounds provide the aroma, flavor and effect of the final product. Fast extractions are possible with butane but little control of all the material, while CO2 can be tunable and therefore is able to collect all of the same material, just through a segmented process.

Butane Hash Oil, commonly referred to as BHO, is a type of *cannabis* concentrate made using butane as the main solvent. While a number of variables can determine the final consistency of BHO (mostly temperature), people use different names when referring to each of the different consistencies. Under this form of extraction, THC content can be as high as 80-90%. This makes BHO a popular choice for many medical marijuana patients suffering from chronic pain, sleep disorders, and other intractable symptoms. It is essential to make sure that the oil is lab tested for purity, as improperly purged BHO may contain traces of butane, pesticides, or other unhealthy ingredients or contaminants.

The carbon dioxide or CO2 method is dependent on turning CO2 into a supercritical liquid. This method uses carbon dioxide under high pressure and extremely low temperatures to isolate, preserve, and maintain the purity of the medicinal oil. This process is performed until the super-critical liquid form is achieved, at which point the carbon dioxide is able to act as a solvent. This solvent is then forced through an extraction vessel packed with granularly ground *cannabis* material. Although this process requires expensive equipment and a steep operational learning curve, it results in a product that is safe, potent, and free of chlorophyll.

These common practices of extracting the marijuana oil from the plant have proven to be time consuming, expensive, not always efficient and effective, and debatably most importantly not 100% natural—a characteristic important to the marijuana manufacturing business to produce an unblemished, chemical-free product.

SUMMARY OF THE INVENTION

The instant series of system, method and series of apparatuses, as illustrated herein, are clearly not anticipated, rendered obvious, or even present in any of the prior art mechanisms, either alone or in any combination thereof. Thus, the several embodiments of the instant system are illustrated herein.

In one aspect, the present apparatus introduces a novel system and method for improved marijuana oil and rosin extraction and manufacturing.

In yet another aspect, the present apparatus introduces a novel system and method for a more efficient rosin extraction and manufacturing.

In a further aspect, the present apparatus introduces a novel system and method for inexpensive marijuana oil and rosin extraction manufacturing.

In yet another aspect, the present system introduces a novel system and method for rosin extraction and manufacturing that is natural.

A further aspect of the present invention provides a novel mechanism to extract marijuana essential oils, providing a solventless or solvent free product. In one embodiment, the apparatus comprises a series of heated plates and cooling plates in order to achieve high quality product.

In yet another aspect, the present invention provides a novel rosin extraction process that allows the user customizable control of certain parameters such as, temperature, pressure, and time.

Realizing one aspect of the system is a new rosin extraction and manufacturing system that provides a more precise, more efficient, inexpensive, natural and safer, process. Further, the extraction system is customizable and allows the user control of parameters including temperature, pressure, and time.

These together with other objects of the system, along with the various features of novelty, which characterize the system and accompanying apparatuses, are pointed out with particularity in the claims annexed to and forming a part of this disclosure. For a better understanding of the system, its operating advantages and the specific objects attained by its uses, reference should be made to the accompanying drawings and descriptive matter in which there are illustrated preferred embodiments of the system.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

The invention may be more completely understood in consideration of the following detailed description of the various embodiments of the invention in connection with the accompanying drawings, in which.

DETAILED DESCRIPTION OF THE SEVERAL EMBODIMENTS

Figure 1:
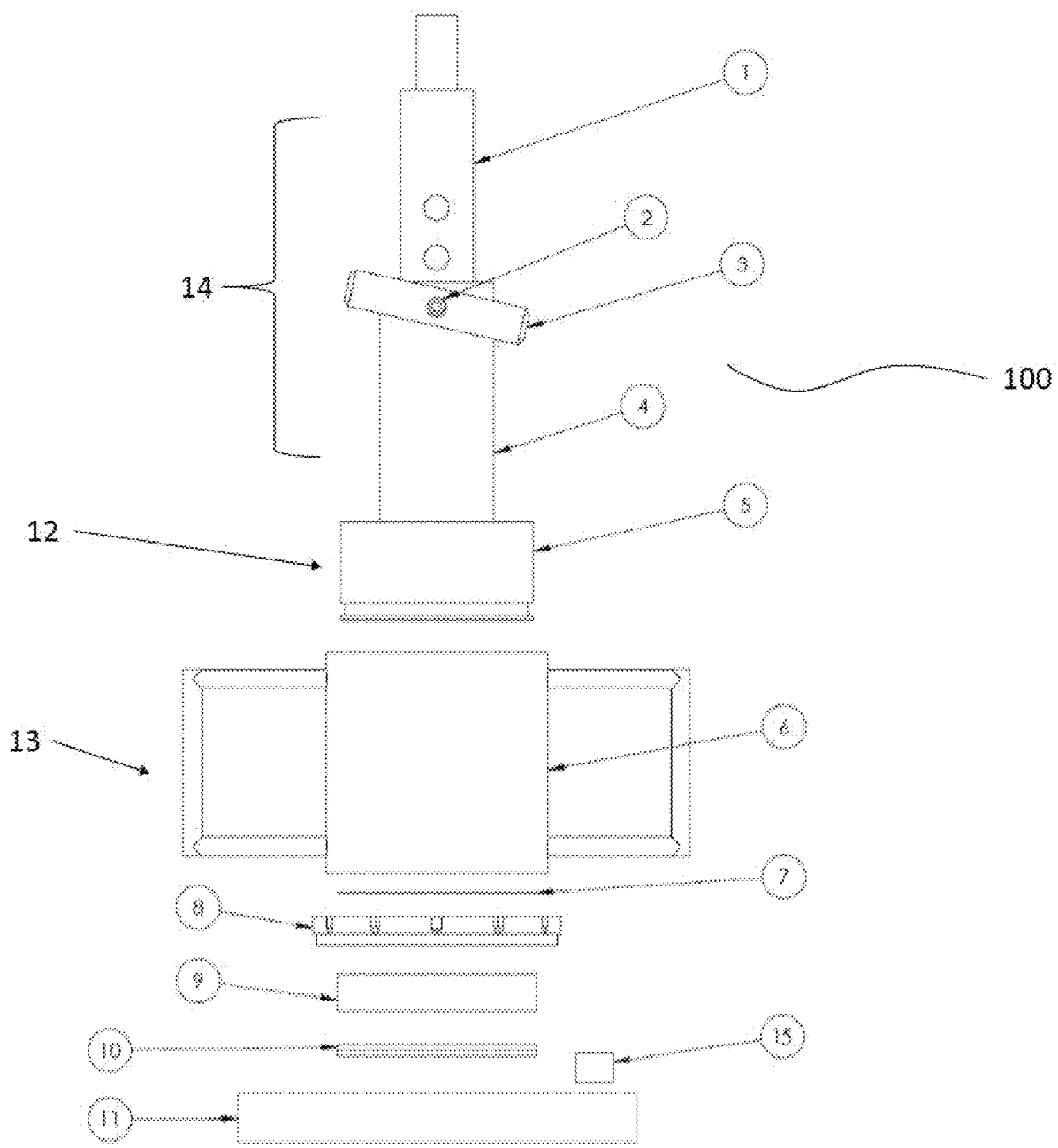
FIG. 1 illustrates an exploded view of one embodiment of a system for rosin extraction.

The detailed description set forth below in connection with the appended drawings is intended as a description of presently-preferred embodiments of the apparatus and does not represent the only forms in which the present apparatus may be constructed and/or utilized. The description sets forth the functions and the sequence of steps for constructing and operating the apparatus in connection with the illustrated embodiments. However, it is to be understood that the same or equivalent functions and sequences may be accomplished by different embodiments that are also intended to be encompassed within the spirit and scope of the invention.

For the following defined terms, these definitions shall be applied, unless a different definition is given in the claims or elsewhere in this specification. All numeric values are herein assumed to be modified by the term "about", whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings wherein like reference numerals indicate like elements throughout the several views. The drawings, which are not necessarily to scale, depict illustrative embodiments of the claimed invention.

FIG. 1 illustrates one embodiment of an exploded view of a system for rosin extraction 100. It is important to note that although the system 100 is designed in a preferred embodiment to extract rosin from marijuana, it may also be used for the extraction of other materials as well.

In a preferred embodiment, the system for rosin extraction 100 comprises a press ram 14, wherein the press ram 14 includes an adjustable shank rod 1, wherein the adjustable shank rod 1 is connected to an adjustable rod mating tube 4. In one embodiment, a lock rod 2 with a corresponding lock handle 3 is located on the adjustable rod mating tube 4 to allow for the variation of the height and depth of the adjustable shank rod 1 during operation. Furthermore, a top press disk 5 with an associated O-ring 12 is connected to and located beneath the adjustable rod mating tube 4. A pressure vessel 6 with an associated pair of handles 13 sits below the top press disk 5, wherein the pressure vessel 6 preferably stores the material utilized in the extraction process.

Additionally a filter 7 is disclosed in connection with the pressure vessel 6 to allow for the filtration of the desired material during the extraction process while preventing any unwanted elements from moving through the system 100. A bottom press disk 8 is used for material extraction and contains the filter 7 between the pressure vessel 6. Furthermore, a bottom heat plate 9 is located below the bottom press disk 8, and a plurality of insulation disk 10 are located below the heat plate 9. Finally, a cooling plate 11 may be placed at the bottom of the system 100.

Figure 2:
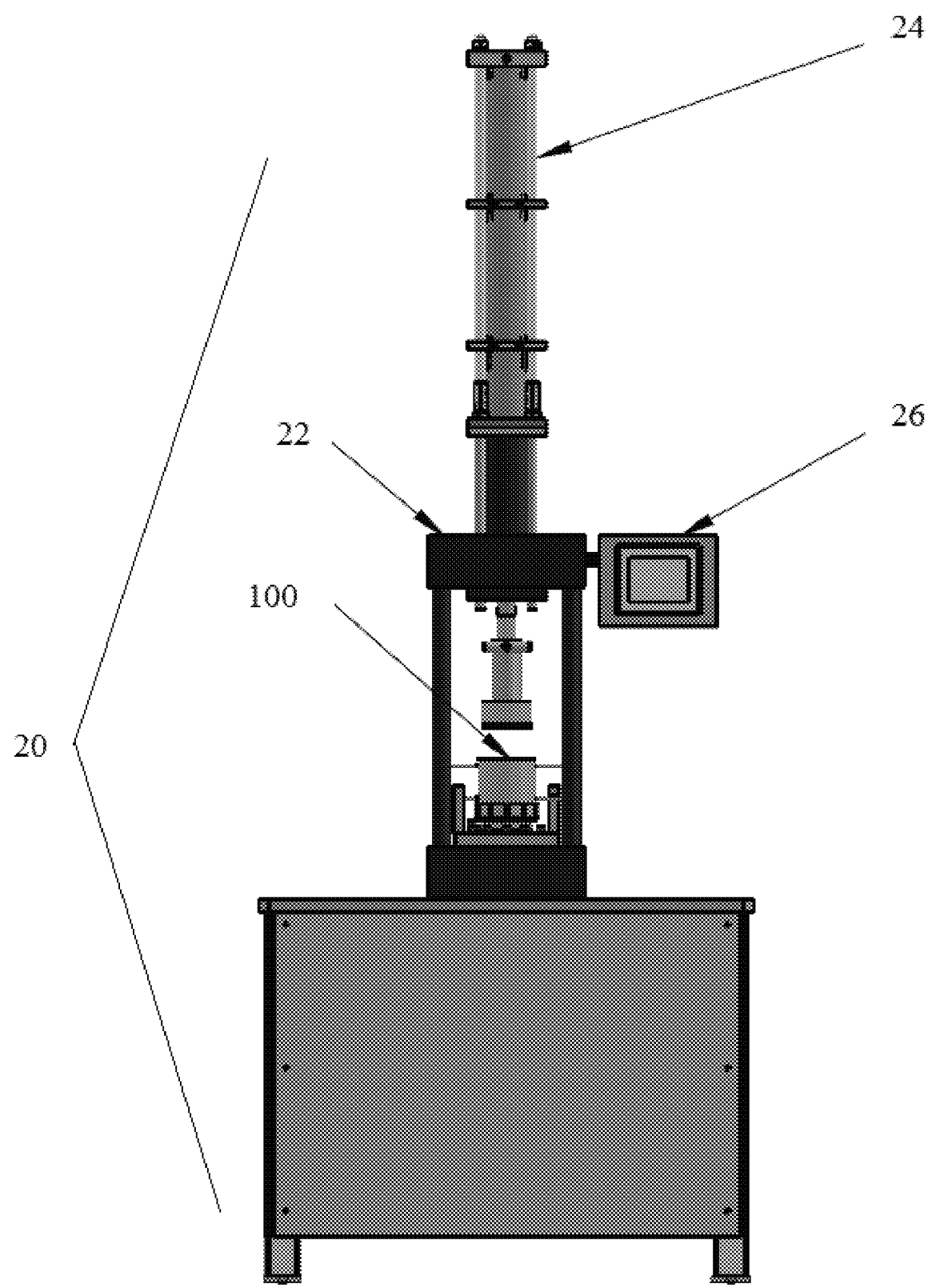
FIG. 2 illustrates a diagrammatic perspective view of one embodiment of a press assembly used in conjunction with the system of rosin extraction.

In certain embodiments, the system for rosin extraction 100 may be configured for use with a number of press systems, including, but not limited to an electric drive press, air or pneumatic press, air-over-oil press, or a full hydraulic press (see FIG. 2). Ideally, the press may be any type of press, wherein the force cycle and the cycle initiation may be controlled by the user.

In one embodiment, the pressure vessel 6 is a heated chamber. In a preferred embodiment, the pressure vessel 6 is an appropriate size in order to accommodate the top press disk 5. In yet another preferred embodiment, the pressure vessel 5 should also be able to accommodate the attachment of the filter 7. The filter 7 is preferably constructed from a material suitable to withstand the force of the press ram 14. The filter 7 in some embodiments may comprise a filter disk-like plate. Further, in some preferred embodiments, the filter 7 may assist in the material handling of the rosin for selling purposes in order to avoid contamination and the use of unnatural bagging systems. The filter 7 may be attached to the pressure vessel 6. In a preferred embodiment, the filter 7 may be perforated to allow for the extraction of the rosin substance; the filter 7 may also be used to seal the pressure vessel 6. Additionally, a collection bin 15 may be provide for storage of any extracted material following the extraction process. The storage of the extracted material in the collection bin 15 may be accomplished via individual cups, a drip tray or other similar systems.

In preferred embodiments, the rosin collection device is removable, portable, storable, containment device. After the rosin is extracted, the end product may be packaged through a bag-less system in order to preserve the organic qualities of the final rosin product.

FIG. 2 illustrates a diagrammatic perspective view of the system for rosin extraction 100 configured for use with a standard press assembly 20. In this embodiment, the rosin extraction system 100 is maintained within an "H" frame 22 and a pneumatic press 24 located above the "H" frame 22. Additionally, a programmable touch screen interface 26 is provided and attached to the "H" frame 22 to enable a user of the system to configure a variety of operational parameters (see FIG. 3) depending on the specific extraction process desired.

Figure 3:
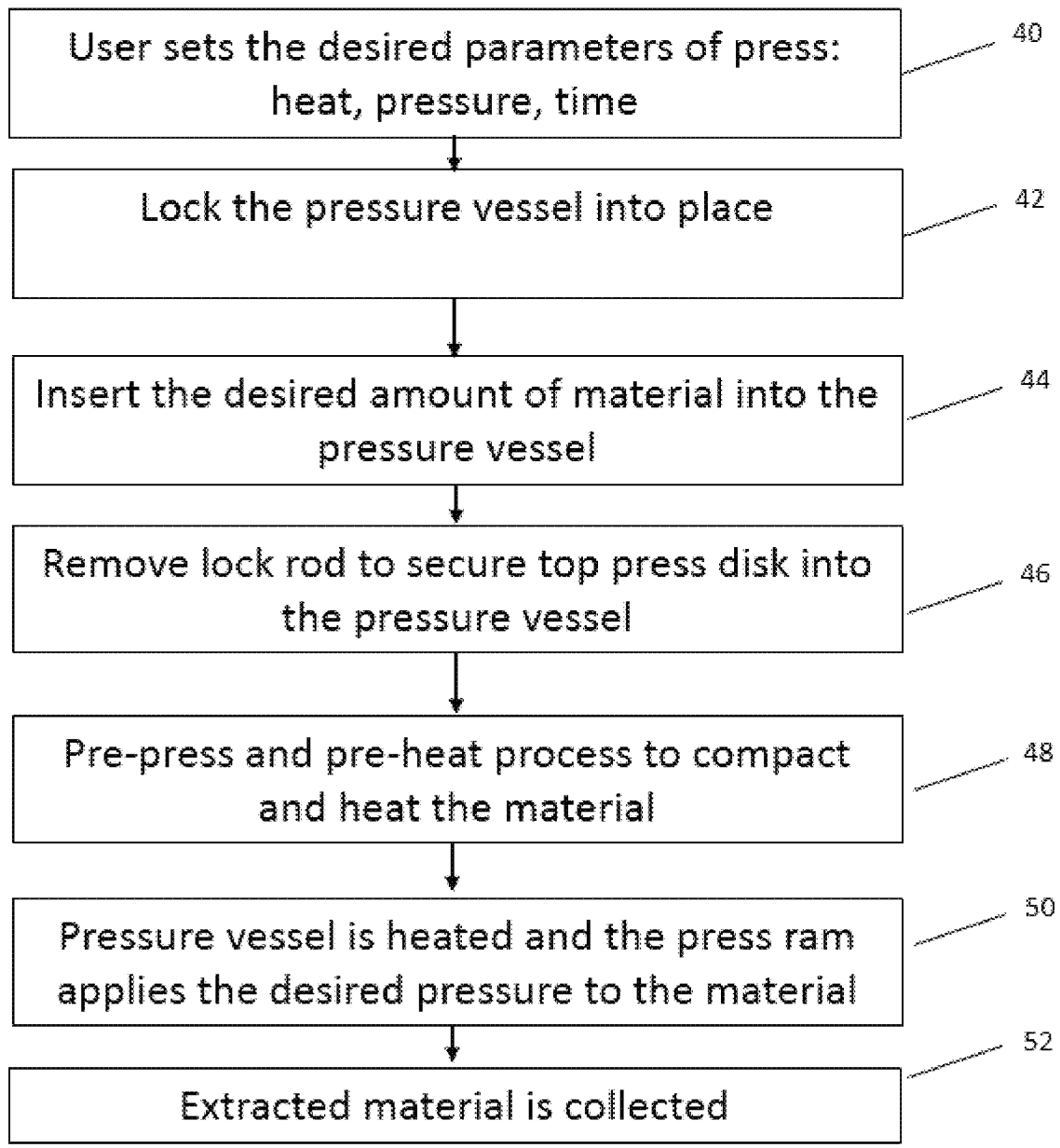
FIG. 3 illustrates a flow chart of one embodiment to extract rosin utilizing the instant system.

FIG. 3 illustrates a flow diagram of one embodiment for rosin extraction utilizing the system for rosin extraction 100. In certain embodiments, the system 100 may function by a user first inputting necessary operating parameters via the touch screen interface 26. For instance, the user may set the desired temperature, pressure (force applied), and time. With each use, the user may desire differing temperatures, pressures, and times, in order to achieve the preferred product and vary the parameters via the touch screen interface 26.

Initially, at step 40, a user sets the desired parameters of temperature, pressure and heat for operation of the rosin extraction system 100. Alternatively, the user of the system may select a predetermined "recipe" (pre-set parameters) via the touch screen interface 26. Following selection and inputting of the operating parameters, at step 42 the pressure vessel 6 is locked into place via a pair of "L" brackets on either side. Next, at step 44, a quantity of material for extraction is loaded into the pressure vessel 6. Following the loading of material, at step 46 the lock rod 2 is removed to adjust the height of the press ram 14 in order to secure the top press disk 5 into the pressure vessel 6. At step 48, a pre-press and pre-heat process is undertaken to both compact and heat the material for extraction. In one embodiment, during the pre-heat/pre-press process in step 48, the purpose is to compress and densify the material for extraction in order to achieve uniform and fast heat transfer. One example of this process may involve the press ram 14 actuating to a certain position/pressure while the material is being heated. It is important to note that no actual extraction occurs at this step, but rather it assists in the preparation for an ideal extraction process.

Subsequently at step 50 the pressure vessel 6 is heated to the desired temperature set during step 40 and then pressure to the desired pressure also set at step 40. Lastly, at step 52 the extracted rosin is collected and stored.

In one embodiment, the three main parameters during the extraction will be the temperature of various elements in the system 100, the amount of force applied to the pressure vessel 6 by the press ram 14, and the time of the material being exposed to the desired temperature and force. In one embodiment, the O-ring 12 and the bottom heat plate 9 will each have a temperature setting in the range between 0-375 degrees Fahrenheit, and more particularly in a range between 190-225 degrees Fahrenheit. Additionally, the cooling operates in a temperature range between 0-70 degrees Fahrenheit. In yet another embodiment, force applied by the press ram 14 is in the range between 0-120 Tons, however depending on the specific application, one may envision utilizing a greater force above the high end of the stated range.

As stated above, a user of the system 100 has the option to either input the settings for each parameter, or alternatively, the user may choose from various programmable "recipes" including, but not limited to:
1. Static:
Single static press applied. Ideal for small batches.
2. Pre-Press Static:
Single static pre-press applied then a single high pressure full press. For compacting higher volumes and minimizing blowout.
3. Pre-Press Ramp:
Pre-Press applied then incrementally increase to high pressure full press. Optimized for densifying low water content material while minimizing blowout. Ideal for hash.
4. Pre-Press Liquification:
Static pre-press applied then increases to high pressure frequency cycling. Provides the best extraction yields for high volumes.
5. Custom:
Customizable force curve with fully programmable sequences of pressure, temperature and
Time All of the methods stated above may be programmed with Force loop-back controls—this feature may determine the optimum "squeezing" time based on the force drop-off as rosin is expressed. The escaping rosin causes the applied force to drop-off, the machine will monitor and adjust the force incrementally, until the drop off is below a set threshold to represent the point at which the remaining material has reached max density—thus expelling the most rosin achievable under the programmed conditions. Sending a machine complete signal to allow operator to proceed with next batch.

In some embodiments, when controlling the force, the user may wish the force to be pre-press, high pressure, ramping, pile driving (liquefy), or static, again depending on what the user wants as the end product. Time may be adjusted in certain embodiments to include prepress dwell, static delay, static dwell, ramp step duration, ramp step delay, liquefy dwell, and liquefy delay. In certain embodiment, temperature may be adjusted to hold, soak, energize, limited to the top plate, limited to the bottom plate, or collar. Other additional controls the user may be able to manipulate include the vacuum to assist the rosin extraction pump, wherein the user may adjust the vacuum in order to draw out the extracted rosin into a holding/collection vessel at room or cooled temperature to maintain the product's purity.

It should be understood that various alternatives to the embodiments of the disclosure described herein may be employed in practicing the disclosure. Elements of an implementation of the systems and methods described herein may be independently implemented or combined with other implementations. It is intended that the claims to follow with the utility application define the scope of the disclosure and that systems, methods, and devices within the scope of these claims and their equivalents be covered thereby.

What is claimed is:

1. An extraction system configured for use with a press assembly, wherein the extraction system comprises:
   a press ram;
   a pressure vessel located beneath the press ram;
   a bottom press disk located beneath the pressure vessel;
   a filter, wherein the filter is located between the pressure vessel and the bottom press disk;
   a bottom heat plate located beneath the filter;
   a plurality of insulation disks located beneath the bottom heat plate; and
   a cooling plate located beneath the plurality of insulation disks.

2. The extraction system configured for use with a press assembly of claim 1, wherein the press ram comprises:
   an adjustable shank rod;
   an adjustable rod mating tube connected to the adjustable shank rod;
   a lock rod with a corresponding lock handle located on the adjustable rod mating tube; and
   a top press disk with an associated O-ring connected to and located beneath the adjustable rod mating tube.

3. The extraction system configured for use with a press assembly of claim 1, wherein the pressure vessel further comprises a pair of handles.

4. The extraction system configured for use with a press assembly of claim 2, wherein the press assembly comprises:
   a frame, wherein the frame houses the extraction system;
   a press located above the frame; and
   a touch screen interface.

5. The extraction system configured for use with a press assembly of claim 4, wherein the touch screen interface is attached to the frame.

6. The extraction system configured for use with a press assembly of claim 4, wherein the press is selected from the group consisting of: electric drive press, pneumatic press, air-over-oil press, and a full hydraulic press.

7. A method for an extraction of a material comprising the steps of:
   providing an extracting system comprising:
      a press ram having an adjustable shank rod, an adjustable rod mating tube connected to the adjustable shank rod, a lock rod with a corresponding lock handle located on the adjustable rod mating tube, and a top press disk with an associated O-ring connected to and located beneath the adjustable rod mating tube;
      a pressure vessel located beneath the press ram;

a bottom press disk located beneath the pressure vessel;
a filter, wherein the filter is located between the pressure vessel and the bottom press disk;
a bottom heat plate located beneath the filter;
a plurality of insulation disks located beneath the bottom heat plate;
a cooling plate located beneath the plurality of insulation disks; and
a touch screen interface;
inputting a set of parameters into the touch screen interface for operation of the extraction system;
locking the pressure vessel into place;
loading a quantity of material for extraction into the pressure vessel;
removing the lock rod to adjust a height of the press ram to secure the top press disk into the pressure vessel;
applying a quantity of heat and pressure to the pressure vessel; and
collecting the extracted material.

8. The method for the extraction of a material of claim 7 wherein the parameters are selected from the group consisting of: temperature, press and time.

9. The method for the extraction of a material of claim 7, wherein the O-ring and the bottom heat plate operate in a temperature range between 0-375 degrees Fahrenheit.

10. The method for the extraction of a material of claim 8, wherein the O-ring and the bottom heat plate operate in a temperature range between 190-225 degrees Fahrenheit.

11. The method for the extraction of a material of claim 8, wherein a quantity of force applied by the press ram is in a range between 0-120 tons.

12. The method for the extraction of a material of claim 8, wherein the cooling plate operates in a temperature range between 0-70 degrees Fahrenheit.

* * * * *